United States Patent Office 2,951,095
Patented Aug. 30, 1960

2,951,095
PRODUCTION OF PENTAERYTHRITOL

Oren V. Luke, Jr., Max O. Robeson, and Wallace E. Taylor, Corpus Christi, Tex., assignors to Celanese Corporation of America, New York, N.Y., a corporation of Delaware No Drawing. Filed Oct. 29, 1952, Ser. No. 317,567

11 Claims. (Cl. 260—635)

This invention relates to the production of pentaerythritol and relates more particularly to an improved process for the production of pentaerythritol by the reaction of acetaldehyde and formaldehyde.

Pentaerythritol, an industrially important polyhydric alcohol, can be prepared by condensing acetaldehyde with formaldehyde in aqueous solution by means of a suitable inorganic base. The most frequently used base is calcium hydroxide. In the processes which have been employed for the production of pentaerythritol on a commercial scale, the acetaldehyde is commonly added to an aqueous solution of calcium hydroxide and an excess of formaldehyde over a period of thirty minutes to one hour, or more. During this addition, the temperature is carefully controlled to between 30 and 35° C., or lower. The temperature is then allowed to rise to a point just short of the temperature which causes a brown coloration to occur to condense excess unreacted formaldehyde. This may be any temperature from 45 to 65° C. and is determined by trial and error by the operator. When the aldehyde concentration has diminished to the desired point, the reaction is stopped by the addition of an acid, usually sulfuric acid, which simultaneously precipitates most of the calcium as calcium sulfate. The pentaerythritol is then recovered by concentration of the reaction medium until the solubility of pentaerythritol is exceeded and it can be precipitated by chilling. The product obtained, upon recrystallization, usually contains 80 to 90 percent by weight of pentaerythritol, with the balance being principally dipentaerythrityl ether. Yields claimed for this process are in the range of 55 to 70 percent of theoretical based on the acetaldehyde and 45 to 55 percent of theoretical based on the formaldehyde.

It is known to those skilled in the art that two types of undesirable by-products are produced by the foregoing method. The first is the aforementioned dipentaerythrityl ether along with some tripentaerythrityl ether and possibly higher ethers of pentaerythritol. Second, syrupy self-condensation products of formaldehyde are formed. Both kinds of by-products interfere with the recovery of the desired pentaerythritol and, in addition, decrease the yield of this product. Because of the presence of these impurities, an involved and elaborate purification procedure is necessary to obtain a product suitable for commercial use. According to one such purification procedure, the reaction medium is filtered to remove calcium sulfate and it is then concentrated and a first crop of pentaerythritol is crystallized therefrom. The first crop of crystals is centrifuged from the reaction medium and washed. The reaction medium is then concentrated further, a second crop of pentaerythritol is crystallized therefrom and the second crop of pentaerythritol crystals is centrifuged from the reaction medium and washed. The first and second crops of crystals are combined, redissolved and recrystallized and the crystals obtained are centrifuged and dried. It will be apparent that the foregoing purification process adds greatly to the expense involved in the production of pentaerythritol.

It is an important object of this invention to provide an improved process for the production of pentaerythritol which will be free from the foregoing and other difficulties and which will be especially efficient in operation.

A further object of this invention is to provide a process for the production of pentaerythritol of higher purity and in improved yields by eliminating or minimizing the production of undesirable impurities.

Another object of this invention is to provide a simplified process for the production of pentaerythritol whereby an improved yield of high purity pentaerythritol may be readily achieved.

Other objects of this invention will be apparent from the following detailed description and claims.

According to one feature of the present invention, there is provided a process for the production of pentaerythritol by the condensation of acetaldehyde with formaldehyde by means of a suitable inorganic base in which all the reactants are mixed together rapidly with agitation at a temperature of between about 15 and 40° C. The mixing should take place in a period of less than about 2 minutes. The reaction is permitted to continue for a period of between about 45 and 240 minutes at the end of which time the temperature of the reaction medium should be between about 45 and 75° C. Normally, there is no need either to heat or cool the reaction medium the heat given off by the exothermic reaction being adequate to raise the temperature of the reaction medium to the desired value. The elimination of the need for heating or cooling the reaction medium or otherwise controlling the temperature of the said medium greatly simplifies the carrying out of the reaction. The increased temperature during the early stages of the reaction increases the rate of condensation of the acetaldehyde and formaldehyde. On the other hand, the reaction medium is not allowed to remain at an elevated temperature for a long enough period to permit appreciable quantities of self-condensation products of formaldehyde to be formed.

In carrying out the reaction in the foregoing manner, the best results have been obtained by employing a large excess of formaldehyde over that theoretically required (four moles) to react with the acetaldehyde. Thus, for each mole of acetaldehyde there should be employed between about 10 and 20 moles of formaldehyde. The quantity of inorganic base should also be somewhat in excess of that theoretically required (one equivalent) for each mole of acetaldehyde; good results having been obtained with from about 1.0 to 1.3 equivalents of inorganic base for each mole of acetaldehyde. The quantity of water present in the reaction mixture is advantageously such that the total concentration of aldehydes is between about 15 and 30 percent by weight on the total weight of the mixture, at which concentrations no heating or cooling is needed to bring the reaction medium to the desired temperature.

At the end of the reaction period, the pentaerythritol may be recovered from the reaction medium in the manner previously employed for this purpose. However, far superior results are obtained, when calcium hydroxide is employed as the inorganic base, by bringing the pH of the reaction medium to between about 7.5 and 6.5 by the addition thereto of a small quantity of acid such as, for example, acetic, formic, hydrochloric or sulfuric acid. The excess formaldehyde is then recovered from the reaction medium by distillation. The distillation is best effected at a superatmospheric pressure of between about 10 and 30 pounds per square inch gage, but may also be effected at atmospheric pressure or may comprise a steam distillation. The recovered formaldehyde may be recycled as feed to the reaction mixture. Following removal of the formaldehyde, the reaction medium is acidified further with sulfuric acid to precipitate the calcium as calcium sulfate and the pentaerythritol is recovered in accordance with the procedure outlined above. The recovery of the pentaerythritol by this process is unhampered by the presence of the syrupy condensation products of formaldehyde and the product obtained is low in dipentaerythritol or higher pentaerythrityl ethers.

According to another feature of this invention, the condensation of acetaldehyde and formaldehyde is carried out in the manner outlined above using sodium or potassium hydroxides rather than calcium hydroxide. At the end of the reaction period, the pH of the reaction mixture is brought to between about 7.5 and 6.5 by the addition thereto of an acid, such as for example, formic, acetic, hydrochloric or sulfuric acid. The excess formaldehyde may then be recovered from the reaction medium by distillation in the manner outlined above. Surprisingly enough, it has been found that under the conditions of the reaction, sodium and potassium hydroxides are not as active as calcium hydroxide in catalyzing the formation of undesired by-products which would contaminate the pentaerythritol and render it more difficult to purify. As a result, pentaerythritol of high purity may be obtained in higher yields in a single crystallization than has hitherto been possible employing two or three crystallizations followed by a recrystallization. Moreover, because the sodium and potassium salts formed during the reaction and on neutralization of the base are soluble in the reaction medium it is unnecessary to filter said medium before the recovery of the pentaerythritol therefrom. The recovery of the pentaerythritol is accordingly further simplified by the elimination of this step. Following the neutralization of the base, the recovery of the pentaerythritol according to this feature of the invention may be carried out simply by distilling the excess formaldehyde, concentrating the residue from the formaldehyde distillation, crystallizing the pentaerythritol, centrifuging and washing the crystals and drying the crystals. The simplicity of this recovery process, as compared with prior processes, greatly reduces the expense involved in recovering the pentaerythritol.

The following examples are given to illustrate this invention further.

*Example I*

A slurry is formed by mixing together 88.8 parts by weight of calcium hydroxide and 1200 parts by weight of water. To this slurry there is added, in a period of ½ minute and with stirring, a mixture containing 600 parts by weight of formaldehyde (as a 37% by weight aqueous solution) and 88 parts by weight of acetaldehyde. This mixture is stirred for one hour during which time it rises from a temperature of 25° C. to approximately 60° C. No cooling or temperature control is required. At the end of the hour, the solution is acidified to pH 7.0 by the addition of 40 parts by weight of a 50 percent by weight aqueous solution of sulfuric acid and the calcium sulfate which precipitates out is filtered off. The excess formaldehyde is then removed by distillation at a pressure of 10 pounds per square inch gage until the formaldehyde content of the reaction medium is less than one percent by weight. The reaction medium is acidified by the addition of 175 parts by weight of a 50 percent by weight aqueous solution of sulfuric acid and the calcium sulfate which precipitates out is removed by filtration. The filtrate is concentrated by distillation to the point of incipient crystal formation, chilled and the crystallized pentaeryhritol recovered by filtration. A second crop of crystals is obtained in like manner. The two crops of crude crystals are combined and recrystallized from water. There are obtained 209.3 parts by weight of product corresponding to a yield of 77 percent of theoretical based on the acetaldehyde. After allowance for the recovered formaldehyde, the yield corresponds to 70 percent of theoretical based on the formaldehyde. The product had a melting point of 250° C. and analyzed as 97.10 percent pentaerythritol, 2.80 percent dipentaerythritol, 0.07 percent calcium sulfate and 0.03 percent water.

When the aldehydes are added to the calcium hydroxide slurry over a period of 45 minutes and the temperature of the reaction medium is held at 20° C. during this addition, a period of 5 hours is required to complete the reaction. The final product, isolated in the manner described above, amounts to 191 parts by weight, equivalent to a yield of 70 percent of theoretical based on the acetaldehyde and 68 percent of theoretical based on the formaldehyde. The product is of lower purity having a melting point of 247° C. and a dipentaerythritol content of 5 percent by weight.

When the ratio of formaldehyde to acetaldehyde is reduced to 5 to 1 and the reaction is carried out in the manner set out in the preceding paragraph, there are obtained only 168 parts by weight of product. This corresponds to a yield of 61.5 percent of theoretical based on the acetaldehyde and 65.9 percent of theoretical based on the formaldehyde, after allowance for the recovered formaldehyde. The product is of still lower purity, having a melting point 231° C. and containing 6.6 percent by weight of dipentaerythritol.

If the reaction is carried out in the manner described in the preceding paragraph and the small excess of formaldehyde is removed by alkaline condensation as has heretofore been the general practice instead of by distillation, there are obtained 169 parts by weight of pentaerythritol, corresponding to a yield of 62.5 percent of theoretical based on the acetaldehyde and 50 percent of theoretical based on the formaldehyde. The product is, however, of much lower purity, having a melting point of only 183° C. and containing 15 percent by weight of dipentaerythritol.

*Example II*

There are mixed together, rapidly and with stirring at a temperature of 29° C., over a period of ½ minute, 88 parts by weight of acetaldehyde, 1076 parts by weight of formaldehyde (as a 33 percent by weight aqueous solution), 96 parts by weight of sodium hydroxide (as a 20 percent by weight aqueous solution) and 1250 parts by weight of water. The reaction is continued for one hour during which time the temperature rises to 52° C. At the end of the hour the solution is neutralized to pH7 with 28 parts by weight of a 23.3 percent by weight aqueous solution of acetic acid. The excess formaldehyde is removed by distillation at 10 pounds per square inch gage until the formaldehyde content of the reaction medium is less than one percent by weight. The reaction medium is concentrated to the point of incipient crystallization by distillation at 335 mm. pressure until the temperature reaches 90.6° C. then crystallized by cooling and the crystals separated by filtration. The crystals are washed with water on the filter, the washings being recycled to the concentrator to recover any dissolved pentaerythritol. After drying, there are obtained 251 parts by weight of pentaerythritol, corresponding to a yield of 92 percent of theoretical based on the acetaldehyde and 75 percent of theoretical based on the formaldehyde, after correcting for the formaldehyde recovered by distillation. The product, without further purification, had a melting point of 249° C. and a dipentaerythritol content of 4 percent by weight.

*Example III*

There are mixed together rapidly and with stirring at a temperature of 26° C., over a period of ½ minute, 88 parts by weight of acetaldehyde, 604 parts by weight of formaldehyde (as a 33 percent by weight aqueous solution), 96 parts by weight of sodium hydroxide (as a 20 percent by weight aqueous solution) and 1200 parts by weight of water. The reaction is continued for 46 minutes during which time the temperature rises to 57° C. At the end of this time the solution is neutralized to pH7 with 58 parts by weight of a 23 percent by weight aqueous solution of acetic acid. The excess formaldehyde is removed by distillation at 10 pounds per square inch gage until the formaldehyde content of the reaction medium is less than one percent by weight. The reaction medium is concentrated by distillation to the point of incipient crystallization, then crystallized by cooling and the crystals separated by filtration and washed with water. There are obtained 227 parts by weight of pentaerythritol, corresponding to a yield of 84 percent of theoretical based on the acetaldehyde and 79 percent of theoretical based on the formaldehyde. The product, without further purification, had a melting point of 241° C. and contained 5 percent by weight of dipentaerythritol. The mother liquor from the crystallization contains an additional 20 parts by weight of pentaerythritol which may be recovered by further processing.

It is to be understood that the foregoing detailed description is given merely by way of illustration and that many variations may be made therein without departing from the spirit of our invention.

Having described our invention what we desire to secure by Letters Patent is:

1. Process for the production of pentaerythritol which comprises mixing together acetaldehyde, about 10 to 20 moles of formaldehyde per mole of acetaldehyde, water and an inorganic base rapidly and with agitation in a period of less than 2 minutes to cause said aldehydes and said base to react at a temperature of about 45 to 75° C.

2. Process as set forth in claim 1 in which said base is sodium hydroxide.

3. Process as set forth in claim 2 in which said reactants are initially at a temperature of about 15 to 40° C.

4. Process as set forth in claim 2 in which there are about 1 to 1.3 equivalents of sodium hydroxide per mole of acetaldehyde.

5. Process as set forth in claim 2 in which the total reaction time is about 45 to 240 minutes.

6. Process as set forth in claim 2 in which excess formaldehyde is removed by distillation after said reaction.

7. Process as set forth in claim 2 in which, following the completion of the reaction, acid is added to the reaction mixture and then excess formaldehyde is distilled from the reaction mixture.

8. Process as set forth in claim 7 in which the distillation of excess formaldehyde is effected at a pressure of about 10 to 30 pounds per square inch gauge.

9. Process as set forth in claim 7 and comprising the step of crystallizing pentaerythritol from the residue of said distillation.

10. Process as set forth in claim 1 in which the reaction temperature is 52 to 60° C.

11. Process as set forth in claim 1 in which said base is sodium hydroxide, in amount of about 1 to 1.3 moles per mole of acetaldehyde, said reactants are initially at a temperature of about 15 to 40° C., the total reaction time is about 45 to 240 minutes, acid is added to the reaction mixture after completion of the reaction, excess formaldehyde is distilled from the reaction mixture at a pressure of about 10 to 30 pounds per square inch gauge, and pentaerythritol is recovered from the residue of said distillation by crystallization.

References Cited in the file of this patent

UNITED STATES PATENTS

| | | |
|---|---|---|
| 2,501,865 | Fuchs | Mar. 28, 1950 |
| 2,562,102 | Jackson et al. | July 24, 1951 |
| 2,790,836 | Mitchell et al. | Apr. 30, 1957 |

FOREIGN PATENTS

| | | |
|---|---|---|
| 357,783 | Great Britain | Oct. 1, 1931 |